United States Patent
Sasaki et al.

(10) Patent No.: US 7,171,078 B2
(45) Date of Patent: Jan. 30, 2007

(54) METHOD AND APPARATUS FOR FABRICATING FIBER BRAGG GRATINGS

(75) Inventors: Kensuke Sasaki, Kanagawa (JP); Akihiko Nishiki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/885,659

(22) Filed: Jul. 8, 2004

(65) Prior Publication Data

US 2005/0018966 A1   Jan. 27, 2005

(30) Foreign Application Priority Data

Jul. 25, 2003   (JP)   ............... 2003-279518

(51) Int. Cl.
G02B 6/34   (2006.01)
(52) U.S. Cl. .................................................. 385/37
(58) Field of Classification Search ............ 385/37
See application file for complete search history.

(56) References Cited

U.S. PATENT DOCUMENTS

| | | | |
|---|---|---|---|
| 5,914,207 A | | 6/1999 | Nishiki et al. |
| 6,072,926 A | * | 6/2000 | Cole et al. .................. 385/37 |
| 6,456,762 B1 | * | 9/2002 | Nishiki et al. .............. 385/37 |
| 6,804,437 B1 | * | 10/2004 | Murashima et al. ........ 385/37 |
| 2003/0012502 A1 | * | 1/2003 | Riant et al. ................. 385/37 |
| 2003/0156791 A1 | * | 8/2003 | De Groot ................... 385/37 |

FOREIGN PATENT DOCUMENTS

JP   11-142659   5/1999

OTHER PUBLICATIONS

Toru Mizunami, "Optical Fiber Bragg Gratings", Oyo Buturi, vol. 67, No. 9 (1998), pp. 1029-1034.
Akihiko Nishiki et al., "Development of Encoder/Decoder for OCDM using a SSFBG: A Verification of data-rate Enhancement Method", The Institute of Electronics, Information and Communication Engineers (IEICE), Technical Report of IEICE. OFT2002-66 (Nov. 2002), pp. 13-18.
W.H. Lohet et al., "Complex grating structures with uniform phase masks based on the moving fiber scanning beam technique", Optics Letters, vol. 20, No. 20, Oct. 15, 1995, pp. 2051-2053.

* cited by examiner

*Primary Examiner*—Sung Pak
*Assistant Examiner*—Tina M. Wong
(74) *Attorney, Agent, or Firm*—Rabin & Berdo, P.C.

(57) ABSTRACT

A method for fabricating fiber Bragg gratings including: scanning a photosensitive optical fiber with ultraviolet laser light in a longitudinal direction of the optical fiber by means of a phase mask method, thereby forming periodic refractive index modulation structure in a core of the optical fiber in the longitudinal direction; and instantaneously moving a phase mask used in the phase mask method by a predetermined distance in the longitudinal direction, thereby forming a phase shift portion in the periodic refractive index modulation structure formed in the core of the optical fiber, when a radiation position of the ultraviolet laser light reaches a predetermined position, in the middle of the scanning step using the ultraviolet laser light.

17 Claims, 12 Drawing Sheets

METHOD AND APPARATUS FOR FABRICATING FIBER BRAGG GRATINGS

BACKGROUND OF THE INVENTION

1. Field of the Invention

The present invention relates to a method and apparatus for fabricating fiber Bragg gratings (FBGs), particularly, a method and apparatus for fabricating FBGs having a phase shift portion or a change in refractive index modulation amplitude (apodization, for instance).

2. Description of the Related Art

A phase mask method is known as a method for fabricating FBGs by forming Bragg diffraction gratings in a core of an optical fiber. In the phase mask method, the interference light of the ultraviolet laser light is exposed to a core of an optical fiber, thereby forming a periodic refractive index modulation structure in the core of the optical fiber in the longitudinal direction of the optical fiber. See non-patent document 1, Toru Mizunami, "Optical Fiber Bragg Gratings", OYO BUTURI, Vol. 67, No. 9 (1998), pp. 1029–1034.

FBGs having a phase shift portion are used in optical code division multiplexing (OCDM) encoders and decoders. Super structure FBGs (SS-FBGs) used in an OCDM encoder or decoder have multiple phase shift portions formed in positions depending on the code type. One method for forming a phase shift portion in a core of an optical fiber by means of the phase mask method is to reserve an area for forming a phase shift portion in the diffraction gratings of the phase mask. See non-patent document 2, Akihiko Nishiki et al., "Development of Encoder/Decoder for OCDM using a SSFBG: A Verification of Data-rate Enhancement Method", THE INSTITUTE OF ELECTRONICS, INFORMATION AND COMMUNICATION ENGINEERS (IEICE), Technical Report of IEICE. OFT2002-66 (2002-11), pp. 13–18. This method is suitable for mass production of limited types of products and is not suitable for small-lot production of a wide variety of products, because an expensive phase mask must be prepared for each code type.

One method suitable for small-lot production of a wide variety of products uses the phase mask method and builds a phase shift portion or apodization into FBGs by slightly moving or vibrating the optical fiber in the longitudinal direction by a PZT stage utilizing a piezoelectric (PZT) element. See non-patent document 3, W. H. Loh et al., "Complex grating structures with uniform phase masks based on the moving fiber scanning beam technique", Optics Letters, Vol. 20, No. 20, Oct. 15, 1995.

When an optical fiber 110 is slightly moved or vibrated in the longitudinal direction (X-axis direction) without moving a phase mask 116, as shown in FIG. 12A, the optical fiber 110 is displaced in the transverse direction (Y-axis direction orthogonal to the X-axis direction) due to yawing or the like of an X-axis travel mechanism, as shown in FIG. 12B. Especially, the SS-FBGs, which have multiple phase shift portions, require the optical fiber 110 to be shifted (slightly moved) several times, so that the displacement of the optical fiber 110 in the Y-axis direction is enlarged. In a single-mode optical fiber, for instance, a core 110a of the optical fiber where refractive index modulation structure is formed has a diameter as small as about 8 μm, and the intensity distribution of the ultraviolet laser light 120 is a Gaussian curve having a steep rising edge and a steep falling edge, as shown in FIG. 12B. Therefore, the displacement of the optical fiber 110 in the Y-axis direction causes the amount of the ultraviolet laser light 120 exposed to the core 110a of the optical fiber to vary greatly, leading to a wide range of variation in amplitude of refractive index modulation provided in the core 110a of the optical fiber.

In the example described in the non-patent document 3, the PZT receives quasi-square-wave linear variations in voltage, and the linearity between the PZT input voltage and the travel amount cannot be maintained due to the hysteresis and creep characteristics. Therefore, it is difficult to design the process for forming desired refractive index modulation structure in the core 110a of the optical fiber.

SUMMARY OF THE INVENTION

It is an object of the present invention to provide a method and apparatus for fabricating such fiber Bragg diffraction gratings that variation in refractive index modulation amplitude resulting from a transverse displacement of the optical fiber is reduced and that Bragg gratings having a phase shift portion in a desired position of the core of the optical fiber or having refractive index modulation amplitude changed as desired can be formed.

According to the present invention, a method for fabricating fiber Bragg gratings includes: scanning a photosensitive optical fiber with ultraviolet laser light in a longitudinal direction of the optical fiber by means of a phase mask method, thereby forming periodic refractive index modulation structure in a core of the optical fiber in the longitudinal direction; and instantaneously moving a phase mask used in the phase mask method by a predetermined distance in the longitudinal direction, thereby forming a phase shift portion in the periodic refractive index modulation structure formed in the core of the optical fiber, when a radiation position of the ultraviolet laser light reaches a predetermined position, in the middle of the scanning step using the ultraviolet laser light.

The method or apparatus for fabricating fiber Bragg gratings according to the present invention enables Bragg diffraction gratings having a phase shift portion of a desired phase shift amount in a desired position of the core of the optical fiber or having refractive index modulation amplitude changed as desired to be formed, without replacing a phase mask.

Unlike the conventional technique, which slightly moves or vibrates the optical fiber, the method or apparatus for fabricating fiber Bragg gratings according to the present invention slightly moves or vibrates the phase mask in the longitudinal direction, in order to create a phase shift portion or in order to change the refractive index modulation amplitude, so that the position of the core of the optical fiber will not move in the transverse direction of the optical fiber with reference to ultraviolet laser light. Therefore, the method or apparatus for fabricating fiber Bragg gratings according to the present invention enables Bragg diffraction gratings to be formed in the core of the optical fiber with reduced variation in refractive index modulation amplitude.

BRIEF EXPLANATION OF THE DRAWINGS

The present invention will become more fully understood from the detailed description given hereinbelow and the accompanying drawings which are given by way of illustration only, and thus are not limitative of the present invention, and wherein:

FIGS. 3A and 3B are diagrams illustrating a method for fabricating FBGs according to the first embodiment of the present invention, wherein FIG. 3A shows a step of forming refractive index modulation structure before a phase mask is shifted, and FIG. 3B shows a step of forming refractive index modulation structure after the phase mask is shifted;

FIGS. 6A to 6C are diagrams illustrating a method for fabricating FBGs according to the second embodiment of the present invention, wherein FIG. 6A shows the vibration of the phase mask, FIG. 6B indicates that an amplitude of the refractive index modulation in a core of an optical fiber is large when an amplitude of the vibration of the phase mask is small, and FIG. 6C indicates that an amplitude of the refractive index modulation in a core of an optical fiber is small when an amplitude of the vibration of the phase mask is large;

FIGS. 8A and 8B are diagrams illustrating how apodization is formed by the method for fabricating FBGs according to the second embodiment of the present invention, wherein FIG. 8A shows a waveform of an input voltage of the piezoelectric element of the slight-movement stage, and FIG. 8B shows an amplitude of the refractive index modulation in a core of an optical fiber;

FIGS. 10A to 10D are diagrams illustrating a method for fabricating FBGs according to the third embodiment of the present invention, wherein FIG. 10A illustrates operation of a drive circuit (combining circuit) of the piezoelectric element of the slight-movement stage, FIG. 10B shows a waveform of a signal input from a function signal generator, FIG. 10C shows a waveform of an input voltage from a DC voltage generator, and FIG. 10D shows an output waveform from the combining circuit;

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

Figure 1A:
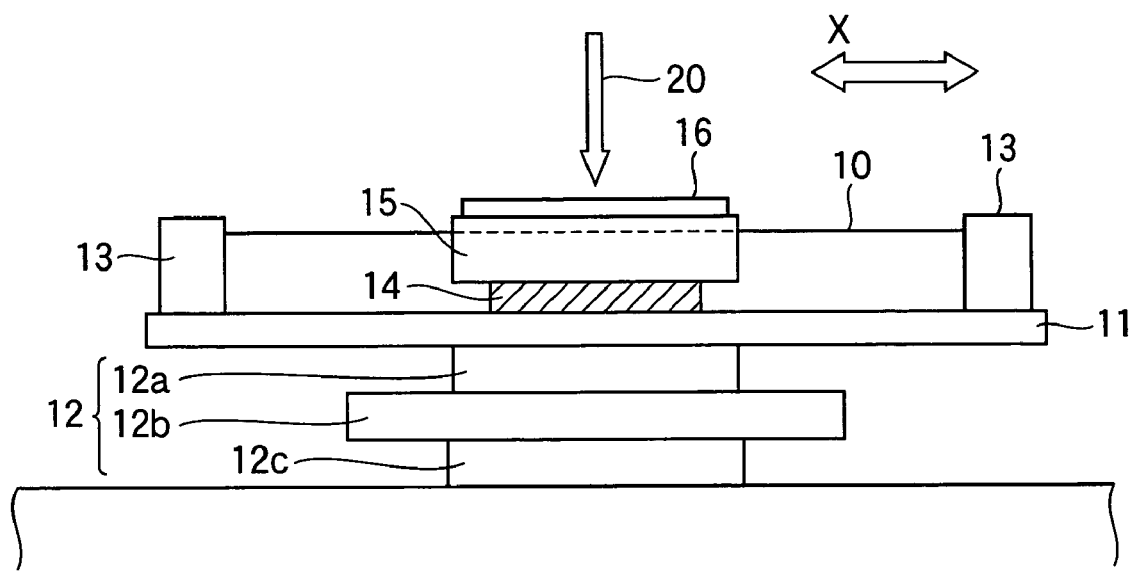
FIGS. 1A and 1B are diagrams schematically showing a configuration of an apparatus for fabricating FBGs according to the first to third embodiments of the present invention, the X-axis direction is shown sideways in FIG. 1A, and the Y-axis direction is shown sideways in FIG. 1B.
Figure 1B:
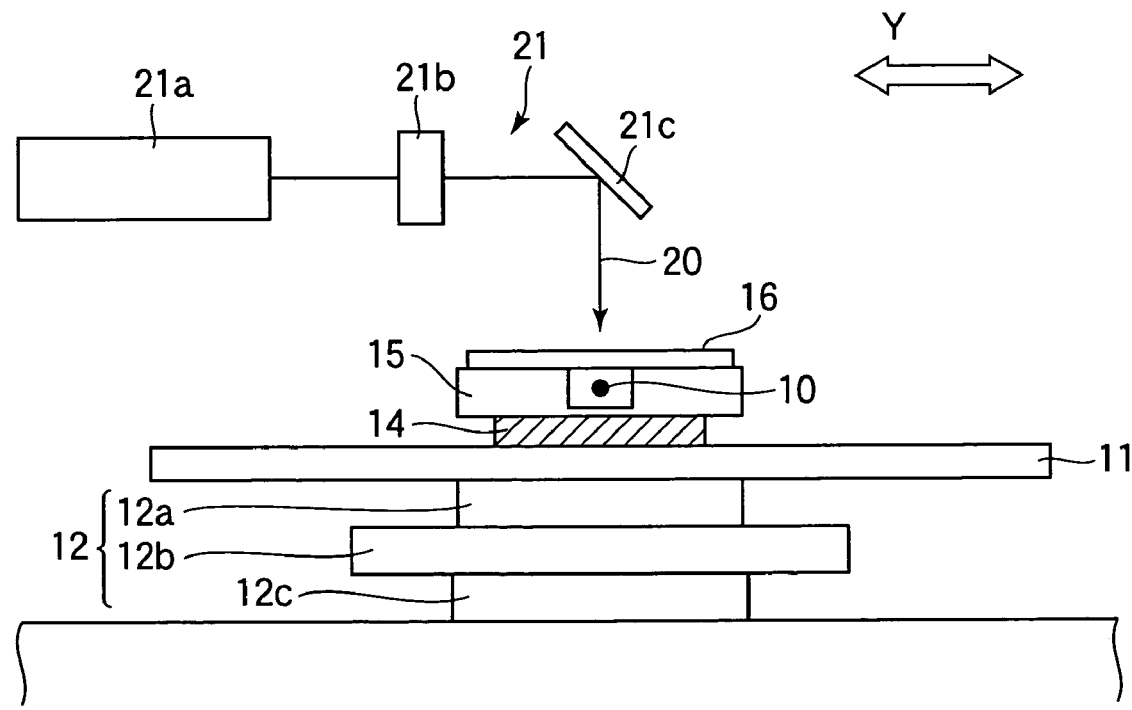

FIGS. 1A and 1B are schematic diagrams showing a configuration of an apparatus for fabricating fiber Bragg gratings (FBGs) according to the first to third embodiments of the present invention. The longitudinal direction of the optical fiber, or the X-axis direction, is shown sideways in FIG. 1A while the Y-axis direction, orthogonal to the X-axis direction, is shown sideways in FIG. 1B. As shown in FIGS. 1A and 1B, the apparatus for fabricating FBGs according to the first to third embodiments includes a base board 11, a stage system 12 which moves or turns the base board 11, a fiber holder 13 which is placed on the base board 11, a slight-movement stage (i.e., a micro-positioning stage or a fine-motion stage) 14 which is placed on the base board 11, a phase mask holder 15 which is placed on the slight-movement stage 14, and a phase mask 16 which is held on the phase mask holder 15. Further, the apparatus for fabricating FBGs also includes an optical system 21 which applies ultraviolet laser light 20 to an optical fiber 10 stretched straight by the fiber holder 13. Used as the optical fiber 10 is a photosensitive optical fiber. The refractive index of the core of the optical fiber varies in response to ultraviolet light exposed to the core.

As shown in FIGS. 1A and 1B, the stage system 12 includes a θ-axis swivel stage 12a, a Y-axis translation stage 12b, and an X-axis translation stage 12c. The θ-axis swivel stage 12a turns the base board 11 about an axis orthogonal to a surface of the base board 11 (a vertical axis (not shown) in FIGS. 1A and 1B), by the driving force of a drive source (not shown) such as a pulse stepping motor. The θ-axis swivel stage 12a is used to orientate the optical fiber 10 held by the fiber holder 13 so that the longitudinal direction of the optical fiber becomes parallel to the X-axis direction (a traveling direction of the X-axis translation stage 12c). The Y-axis translation stage 12b moves the θ-axis swivel stage 12a and the base board 11 in the Y-axis direction orthogonal to the X-axis direction (a traveling direction of the Y-axis translation stage 12b, or a transverse direction of FIG. 1B), by the driving force of a drive source (not shown) such as a pulse motor. The Y-axis translation stage 12b moves the θ-axis swivel stage 12a and the base board 11 in the Y-axis direction in order to align the core of the optical fiber 10 held by the fiber holder 13 with the position where the ultraviolet laser light 20 is exposed. The procedure for adjusting the orientation of the optical fiber 10 by means of the θ-axis swivel stage 12a and the procedure for positioning the optical fiber 10 in the Y-axis direction by means of the Y-axis translation stage 12b are not specified otherwise, and the procedures disclosed in Japanese Patent Kokai (Laid-open) Publication No. 11-142659 (U.S. Pat. No. 5,914,207) may be utilized, for instance.

The X-axis translation stage 12c moves the Y-axis translation stage 12b, the θ-axis swivel stage 12a, and the base board 11 in the X-axis direction (a transverse direction of FIG. 1A), by the driving force of a drive source (not shown) such as a pulse stepping motor. The maximum travel distance of the X-axis translation stage 12c is 150 mm, for instance, and the position movement resolution of the X-axis translation stage 12c is 1 μm, for instance. The X-axis translation stage 12c moves the optical fiber 10 held by the fiber holder 13 on the base board 11 in the longitudinal direction (brought to the X-axis direction, by the θ-axis swivel stage 12a and the Y-axis translation stage 12b), so that the position where ultraviolet laser light 20 is exposed on the optical fiber 10 moves in the X-axis direction (that is, the core of the optical fiber 10 is scanned with the ultraviolet laser light 20).

The slight-movement stage 14 on the base board 11 driven by the piezoelectric (PZT) element slightly moves or vibrates the phase mask holder 15 and the phase mask 16 in the X-axis direction. The maximum travel distance of the slight-movement stage 14 are, for example, 35 μm. The maximum position movement resolution of the slight-movement stage 14 are, for example, 1 nm. The piezoelectric driven slight-movement stage 14 having a position movement resolution of 1 nm is suitable for providing a phase shift portion or for varying the refractive index modulation amplitude in Bragg diffraction gratings of the core 10a of the optical fiber, as will be described in the first to third embodiments. The travel distance of the slight movement stage element can be adjusted by controlling the input voltage of the piezoelectric element.

The operation of the θ-axis swivel stage 12a, the Y-axis translation stage 12b, the X-axis translation stage 12c, and the slight-movement stage 14 is controlled by the corresponding drive circuit (not shown in FIGS. 1A and 1B), in accordance with a control signal from a control unit (not shown) such as a personal computer (PC).

As shown in FIG. 1B, the optical system 21 which exposes the ultraviolet laser light 20 includes a laser light source 21a, a lens 21b, and a mirror 21c. An example of the laser light source 21a is an Ar-CW laser, which generates light with a wavelength of 244 nm (Coherent, Inc., INNOVA 300 Fred (trade name), for instance). The ultraviolet laser light from the laser light source 21a is converged by the lens 21b, is reflected by the mirror 21c, passes the phase mask 16, and hits the core of the optical fiber 10. In FIGS. 1A and 1B, the ultraviolet laser light is exposed to a fixed position, and the X-axis translation stage 12c moves the base board 11 to perform scanning with the ultraviolet laser light 20. Instead of moving the base board 11 in the X-axis direction by means of the X-axis translation stage 12c, the base board 11 may be fixed, and the optical system 21 may be moved in the X-axis direction instead.

First Embodiment

Figure 2:
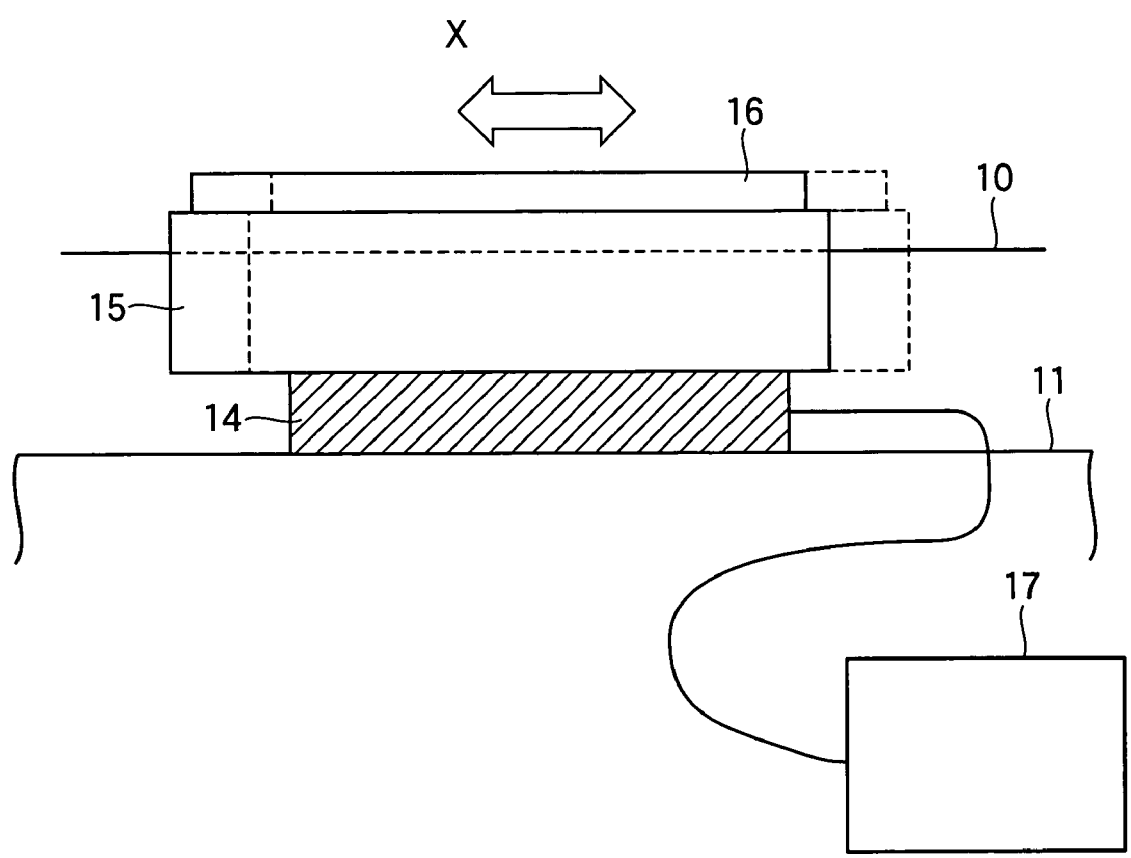
FIG. 2 is a diagram illustrating operation of a slight-movement stage of the apparatus for fabricating FBGs according to the first embodiment of the present invention.

FIG. 2 is a diagram illustrating operation of a slight-movement stage 14 of an apparatus for fabricating FBGs according to the first embodiment of the present invention. The operation of the slight-movement stage 14 is controlled by adjusting the voltage applied to a piezoelectric element of the slight-movement stage 14 by means of a drive circuit (a direct-current (DC) voltage generator 17 in FIG. 2) in accordance with a control signal from a control unit (not shown) such as a personal computer. The control unit of the stage system 12 and the control circuit of the slight-movement stage 14 are generally a single personal computer.

Figure 3A:
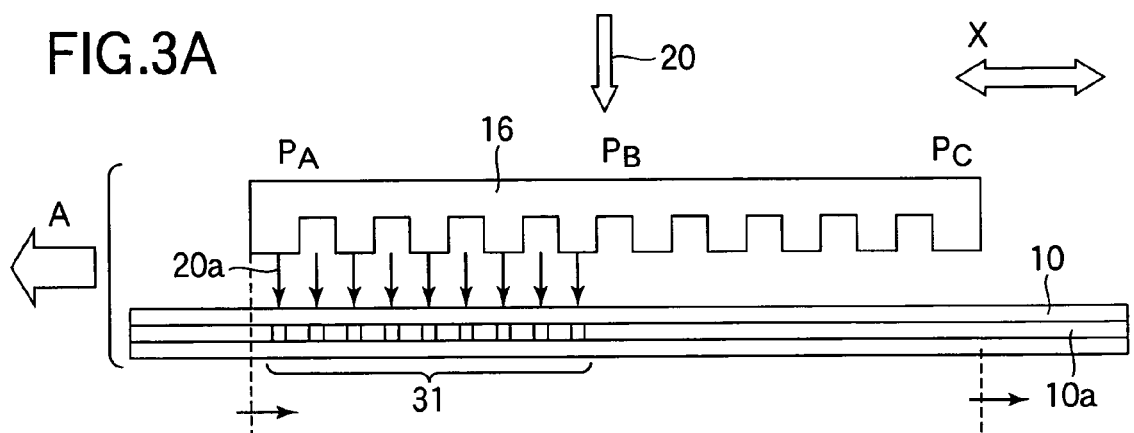
Figure 3B:
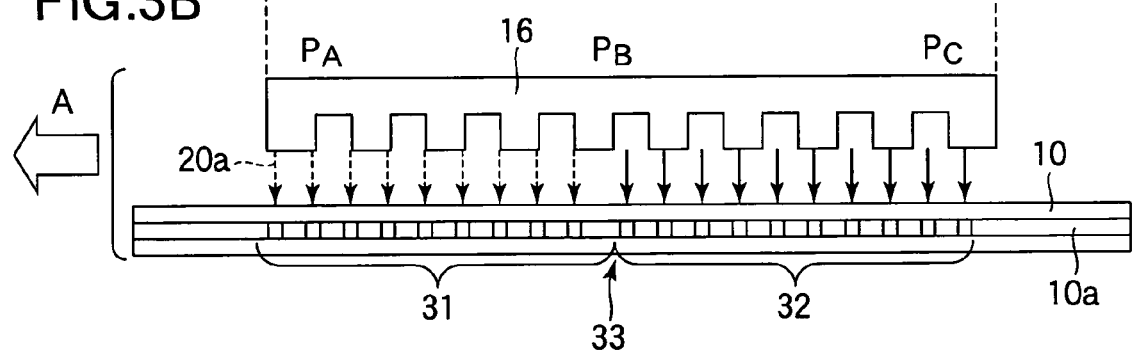

FIGS. 3A and 3B are diagrams illustrating a method for fabricating FBGs according to the first embodiment (operation of the apparatus for fabricating FBGs according to the first embodiment). FIG. 3A illustrates a step of forming refractive index modulation structure before a phase mask 16 is shifted, and FIG. 3B illustrates a step of forming refractive index modulation structure after the phase mask 16 is shifted. When the ultraviolet laser light 20 passes the phase mask 16, interference fringes (interference light 20a) are produced with a half the period of the diffraction gratings of the phase mask 16, as shown in FIGS. 3A and 3B. When these interference fringes fall on the core 10a of the optical fiber, the refractive index of the core 10a of the optical fiber increases in accordance with the amount of irradiation light, forming Bragg diffraction gratings in the core 10a of the optical fiber due to the periodic refractive index modulation structure.

A movement of the base board 11 in the X-axis direction by means of the X-axis translation stage 12c, as shown in FIGS. 1, 3A, and 3B, which is more specifically a movement in the direction of an arrow A, as shown in FIGS. 3A and 3B, causes the radiation position of the ultraviolet laser light 20 to move from a position $P_A$ through a position $P_B$ to a position $P_C$. When the radiation position of the ultraviolet laser light 20 reaches the position $P_B$, the slight-movement stage 14 shifts (slightly moves) the phase mask 16 in the longitudinal direction of the optical fiber 10, or in the X-axis direction (in the direction opposite to the direction of an arrow A, in this example) by a predetermined distance. The travel distance of the phase mask 16 in this movement is a quarter of the period of the diffraction gratings of the phase mask 16 (that is, a half the period of the Bragg diffraction gratings formed in the core 10a of the optical fiber).

As shown in FIGS. 3A and 3B, a scan with the ultraviolet laser light 20 from the position $P_A$ to the position $P_B$ causes Bragg diffraction gratings 31 to be formed in the core 10a of the optical fiber. The speed of the scan with the ultraviolet laser light 20 is a constant value specified within the range from 10 μm/s to 100 μm/s, for instance. During this scan, the relative positions of the phase mask 16 and the optical fiber 10 do not change.

Figure 4:
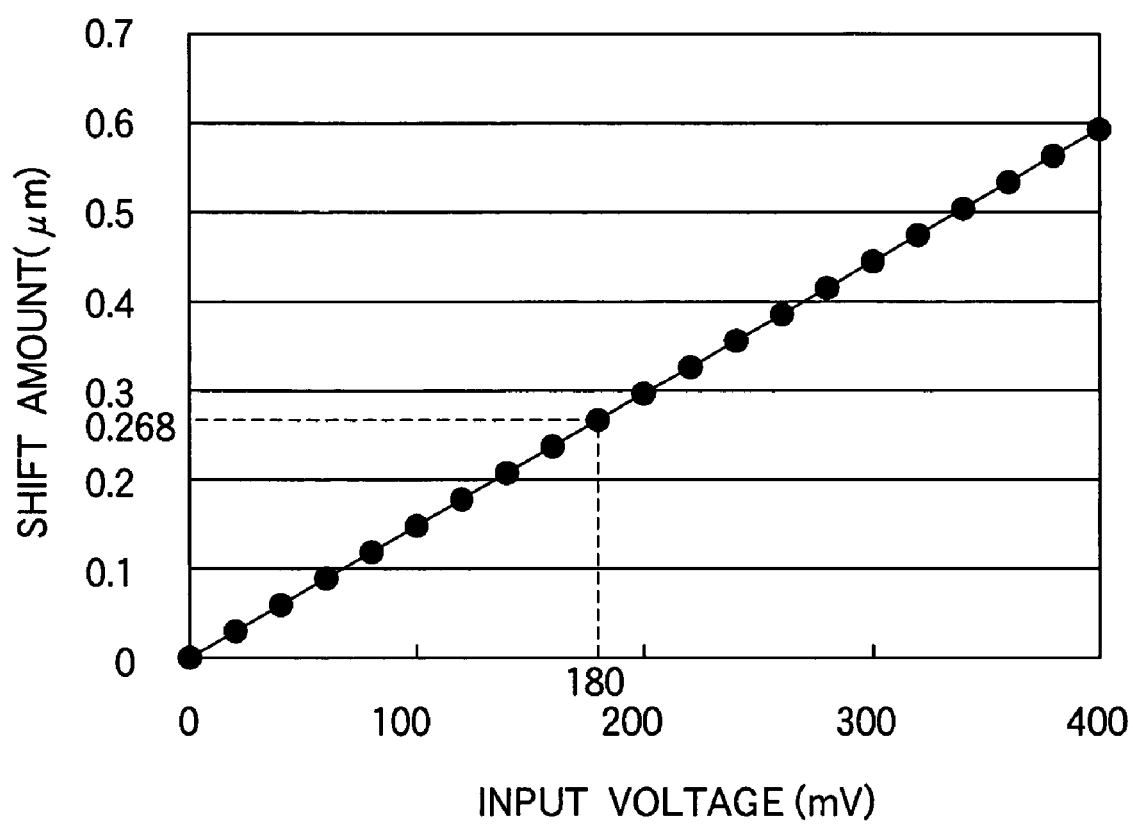
FIG. 4 is a diagram showing a relationship between an input voltage and a shift amount of the slight-movement stage utilized piezoelectric element of the apparatus for fabricating FBGs according to the first embodiment of the present invention.

As shown in FIGS. 1 and 3B, the slight-movement by the slight-movement stage 14 performed when the radiation position of the ultraviolet laser light 20 reaches the position $P_B$ causes a phase shift portion 33 to be formed in the core 10a of the optical fiber. The amount of the slight-movement (the shift amount) is a half the period of the Bragg diffraction gratings in the core 10a of the optical fiber (a quarter of the period of the diffraction gratings of the phase mask 16), and the shift amount becomes the length of the phase shift portion. When the shift amount is 0.268 μm, for instance, the input voltage to the piezoelectric element used by the slight-movement stage 14 is about 180 mV. The input voltage can be obtained from the relationship between the input voltage to the piezoelectric element of the slight-movement stage and the shift amount, as shown in FIG. 4. One example is shown in FIG. 4, but the relationship between the input voltage of the piezoelectric element and the shift amount depends on the type of the piezoelectric element.

As shown in FIG. 3B, a scan with the ultraviolet laser light 20 from the position $P_B$ to the position $P_C$ causes Bragg diffraction gratings 32 to be formed in the core 10a of the optical fiber. The speed of the scan with the ultraviolet laser light 20 is a constant value specified within the range from 10 μm/s to 100 μm/s, for instance. During the scan, the relative positions of the phase mask 16 and the optical fiber 10 do not change. The radiation position of the ultraviolet laser light 20 is fixed, the optical fiber 10 is moved in the direction of an arrow A by means of the X-axis translation stage 12c, and the phase mask 16 is slightly shifted in the X-axis direction by means of the slight-movement stage 14, in this embodiment. However, the radiation position of ultraviolet laser light 20 is moved in FIGS. 3A and 3B, in order to make it easier to understand the positional relationship between the phase mask 16 and the core 10a of the optical fiber in the X-axis direction.

In the FBGs formed in the core 10a of the optical fiber through the process described above, a phase shift corresponding to a half the period of the Bragg diffraction gratings is produced between the two parts divided at the position $P_B$, that is, Bragg diffraction gratings 31 extending from the position $P_A$ to the position $P_B$ and Bragg diffraction gratings 32 extending from the position $P_B$ to the position $P_C$.

The method for fabricating FBGs having one phase shift portion 33 has been described above. FBGs having multiple phase shift portions can be fabricated by repeating the slight-movement of the phase mask 16 by means of the slight-movement stage 14. The multiple phase shift portions 33 can be formed in required positions if a single personal computer controls the operation of the X-axis translation stage 12c and the slight-movement stage 14 in such a manner that the slight-movement stage 14 moves at required positions while the X-axis translation stage 12c is moving. OCDM encoders and decoders using SS-FBGs have Bragg diffraction gratings with multiple phase shift portions 33 depending on a given code length and pattern, and the method for fabricating FBGs according to the first embodiment is suitable for fabricating those types of FBGs.

The phase shift amount can be changed by adjusting the input voltage of the slight-movement stage 14. FBGs can be fabricated with a phase shift portion of a desired shift amount such as one quarter or three quarters of the period of Bragg diffraction gratings formed in the core of the optical fiber. Generally, the phase shift amount is smaller than a half the period of the diffraction gratings of the phase mask 16 (that is, smaller than the period of the Bragg diffraction gratings formed in the core 10a of the optical fiber). If necessary, the phase shift amount may be greater than a half the period of the diffraction gratings of the phase mask (that is, greater than the period of the Bragg diffraction gratings formed in the core 10a of the optical fiber).

Figure 5:
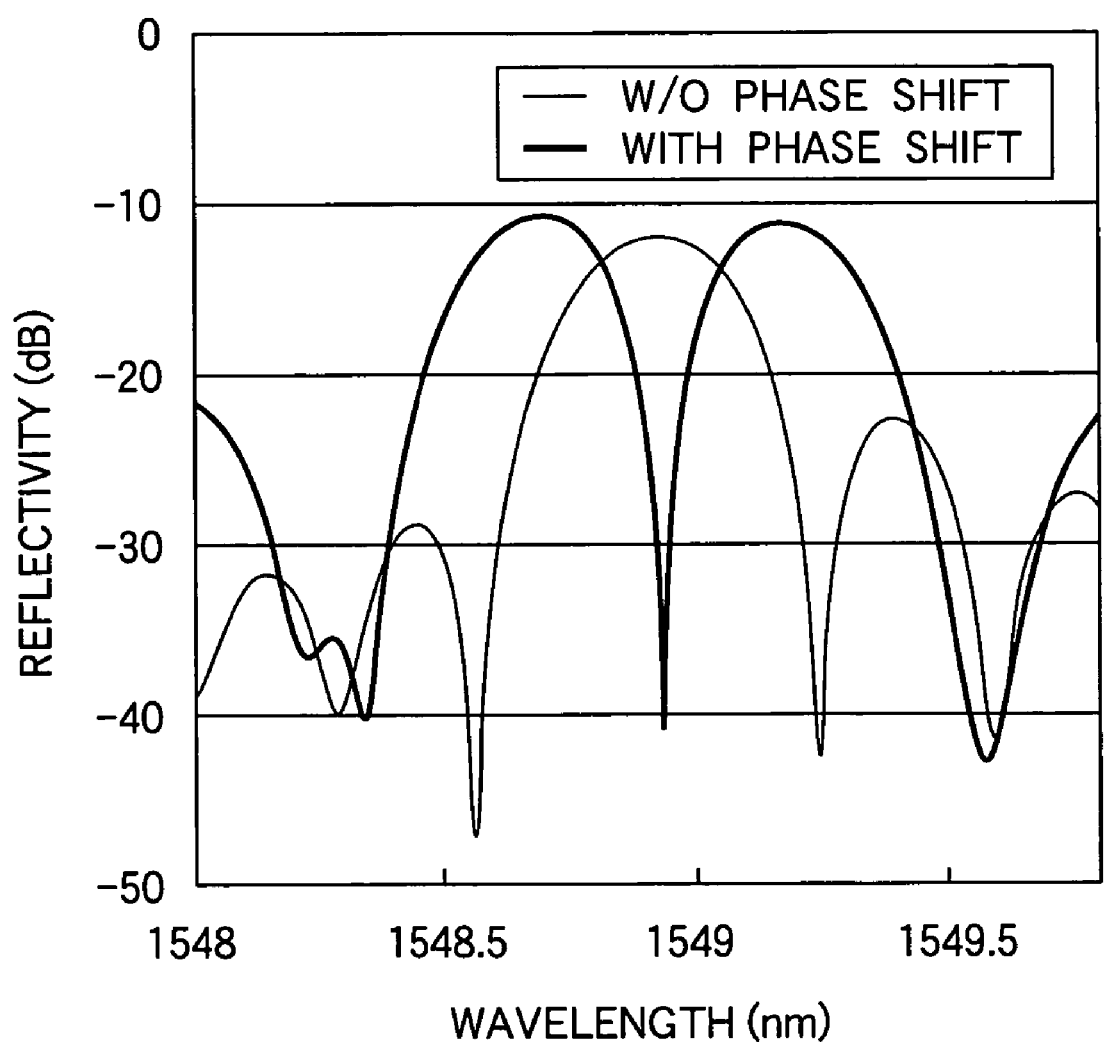
FIG. 5 is a diagram showing a reflection spectrum of FBGs having a phase shift portion (the first embodiment) and a reflection spectrum of FBGs having no phase shift portion (an example for comparison)

FIG. 5 is a diagram showing a reflection spectrum of FBGs having a phase shift portion (the first embodiment) and a reflection spectrum of FBGs having no phase shift portion (an example for comparison). A thick line (denoted as "With phase shift") in FIG. 5 indicates that the reflection spectrum of FBGs having a phase shift portion 33 of a half the period of the Bragg diffraction gratings in the middle of the length of the FBGs has a dip in the center of the reflection band. The length of these FBGs is 2.4 mm, and the phase shift portion is provided in the center (the position 1.2 mm away from the ends). A thin line (denoted as "W/O phase shift") in FIG. 5 indicates that the reflection spectrum of FBGs having no phase shift portion does not have a dip in the center of the reflection band. These actual measurement values related to the reflection spectrum prove that a phase shift portion of a half the period of the Bragg diffraction gratings is successfully formed in the FBGs fabricated according to the first embodiment.

The method and apparatus' for fabricating FBGs according to the first embodiment enable Bragg diffraction gratings to be formed with a phase shift portion 33 of a desired shift amount in a desired position of the core 10a of the optical fiber, without replacing the phase mask 16.

Unlike the conventional technique, which slightly moves the optical fiber 10, the method and apparatus for fabricating FBGs according to the first embodiment slightly moves the phase mask 16 in the longitudinal direction in order to form the phase shift portion 33, so that the positional relationship between the ultraviolet laser light 20 and the core 10a of the optical fiber in the Y-axis direction is maintained. The width of the phase mask 16 in the Y-axis direction is about 5 mm to 10 mm, which is greater than the diameter of the core of the optical fiber, so that any displacement of the phase mask 16 in the Y-axis direction will not change the amount of ultraviolet laser light exposed to the core 10a of the optical fiber. Therefore, if Bragg diffraction gratings are formed in the core 10a of the optical fiber by using the method and apparatus for fabricating FBGs according to the first embodiment, variations in refractive index modulation amplitude resulting from a transverse displacement of the optical fiber can be reduced.

Second Embodiment

Instead of the DC voltage generator (denoted by a reference numeral 17 in FIG. 2) which is used to drive the slight-movement stage in the first embodiment, a function voltage generator is used in the second embodiment, in order to apply a voltage amplitude of a desired function waveform to a piezoelectric element of the slight-movement stage and vibrate a phase mask. In the second embodiment, the vibration of the phase mask by means of the slight-movement stage causes the amplitude of the refractive index modulation in the core of the optical fiber to change, resulting in apodization, for instance.

As shown in FIG. 1, a method for fabricating FBGs according to the second embodiment (operation of the fabrication apparatus according to the second embodiment) includes a step of forming periodic refractive index modulation structure in the core 10a of the optical fiber in the longitudinal direction of the optical fiber 10 by scanning the optical fiber 10 with the ultraviolet laser light 20 in the longitudinal direction (X-axis direction) by means of the phase mask method. The method for fabricating FBGs according to the second embodiment also includes a step of varying the amplitude of the refractive index modulation provided in the core 10a of the optical fiber by vibrating the phase mask 16 used in the phase mask method in the longitudinal direction of the optical fiber 10 and continuously increasing or decreasing the amplitude of the vibration in accordance with the radiation position of the ultraviolet laser light 10, this step being concurrently performed with the step of scanning with the ultraviolet laser light 20.

Figure 6A:
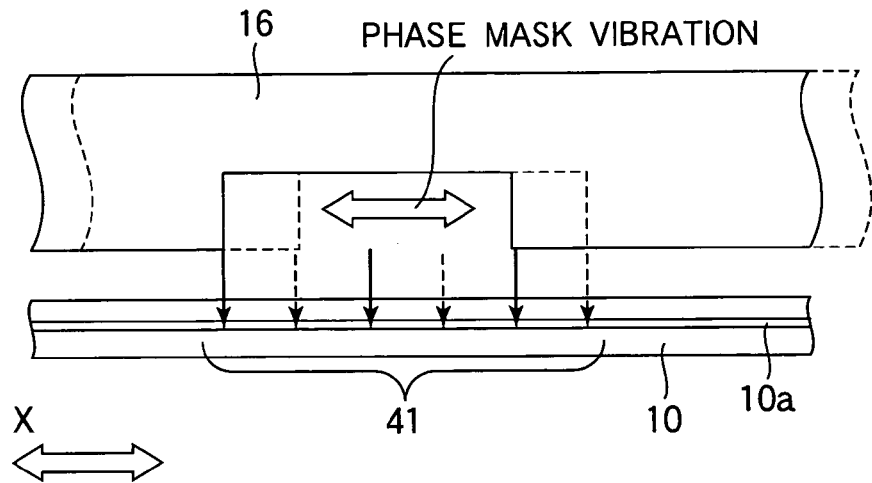
Figure 6B:
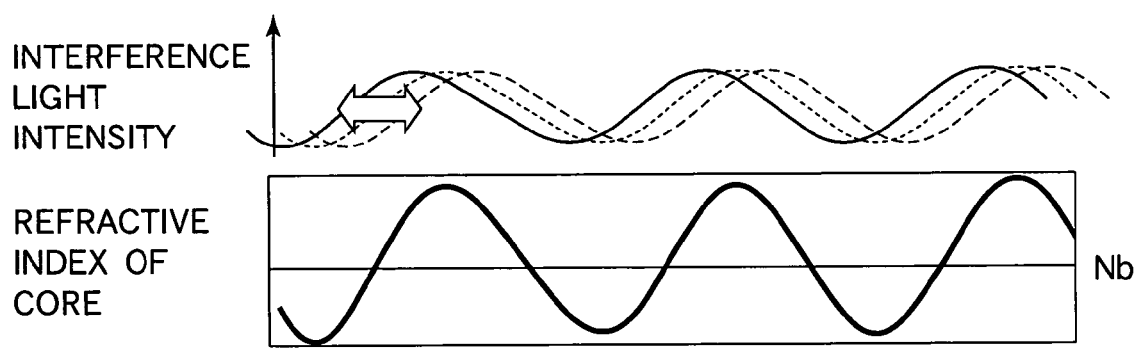
Figure 6C:
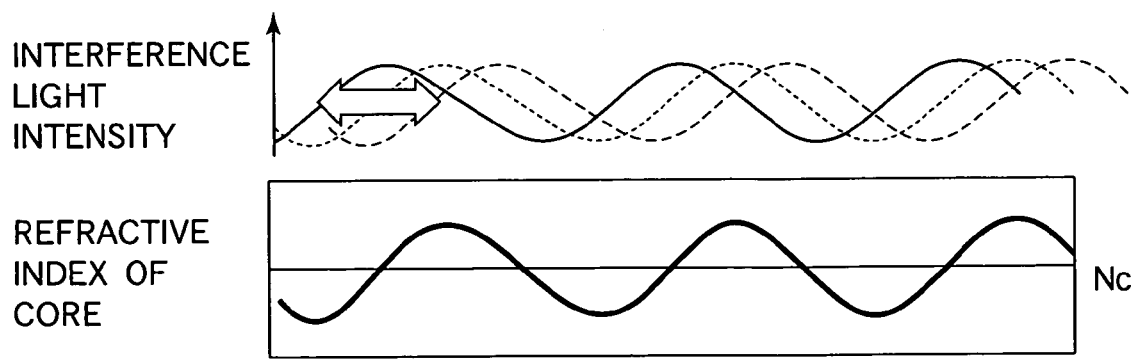

FIGS. 6A to 6C are diagrams illustrating the method for fabricating FBGs according to the second embodiment of the present invention: FIG. 6A shows the vibration of the phase mask; FIG. 6B indicates that the amplitude of the refractive index modulation in the core of the optical fiber is large if the amplitude of the vibration of the phase mask is small; FIG. 6C indicates that the amplitude of the refractive index modulation in the core of the optical fiber is small if the amplitude of the vibration of the phase mask is large. If the phase mask 16 is repeatedly moved (that is, vibrated) between a position indicated by a solid line and a position indicated by a broken line shown in FIG. 6A, the radiation position of the interference light 41 on the core 10a of the optical fiber changes. If the amount of the laser beam exposed to the core 10a of the optical fiber is constant, a small amplitude of vibration of the phase mask 16 results in a large amplitude of refractive index modulation of Bragg diffraction gratings in the core 10a of the optical fiber, because the radiation range of the interference light 41 in the core 10a of the optical fiber is narrow, as shown in FIG. 6B. The amplitude of vibration of the phase mask 16 corresponds to the difference in phase between a solid line and a thick broken line, among three curves (a solid line, a thin broken line, and a thick broken line) representing the radiation intensity of the interference light in FIG. 6B. In addition, a large amplitude of vibration of the phase mask 16 results in a small amplitude of the refractive index modulation of Bragg diffraction gratings in the core 10a of the optical fiber, because the radiation range of the interference light 41 in the core 10a of the optical fiber is wide, as shown in FIG. 6C. The amplitude of vibration of the phase mask 16 corresponds to the difference in phase between a solid line and a thick broken line, among three curves (a solid line, a thin broken line, and a thick broken line) representing the radiation intensity of interference light in FIG. 6C. The average amount of change in the refractive index Nb in FIG. 6B equals the average amount of change in the refractive index Nc in FIG. 6C.

Figure 7:
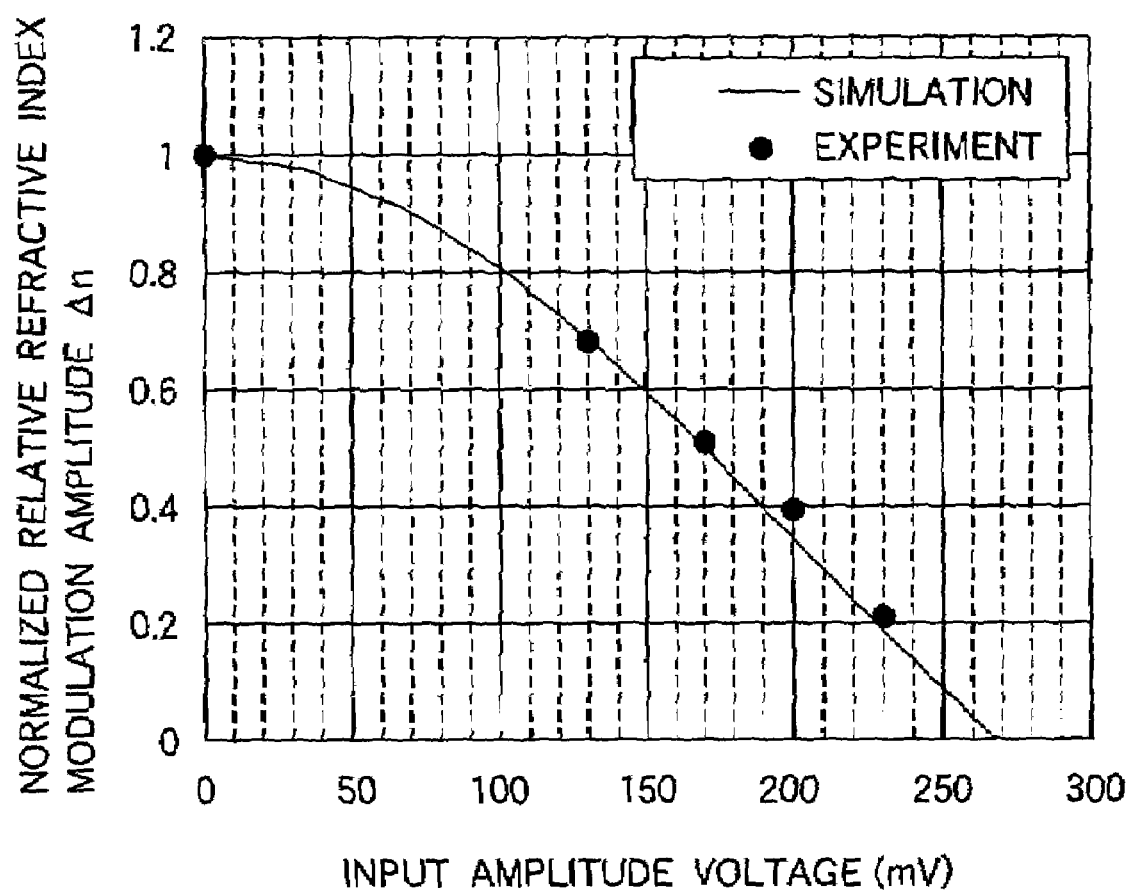
FIG. 7 is a diagram showing a normalized relative amplitude of the refractive index modulation when the vibration of the piezoelectric element of the slight-movement stage in the apparatus for fabricating FBGs according to the second embodiment of the present invention is a sine function.

FIG. 7 is a diagram showing a normalized relative amplitude of the refractive index modulation when the vibration of the piezoelectric element of the slight-movement stage in the apparatus for fabricating FBGs according to the second embodiment of the present invention is a sine function. In the shown example, when the input amplitude voltage of the sine function is 0 mV, the amplitude of the refractive index modulation of Bragg diffraction gratings in the core 10a of the optical fiber is normalized to 1. This graph also indicates the relationship between simulated values and measured values when the function of the amplitude is represented by a sine curve (or cosine curve). The frequency of vibration is set to 10 Hz, for instance. The graph shows that the simulated values and measured values almost agree with each other if the amplitude is controlled as a sine function (or cosine function).

Figure 8A:
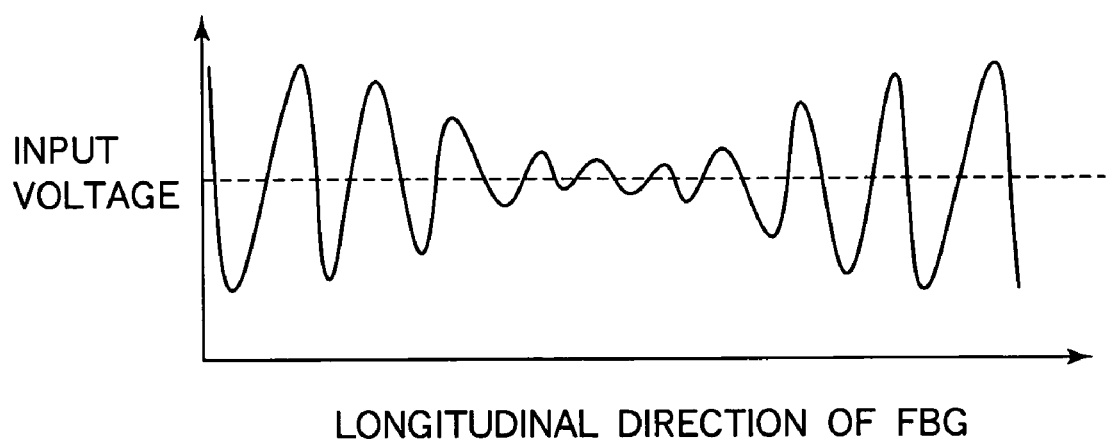
Figure 8B:
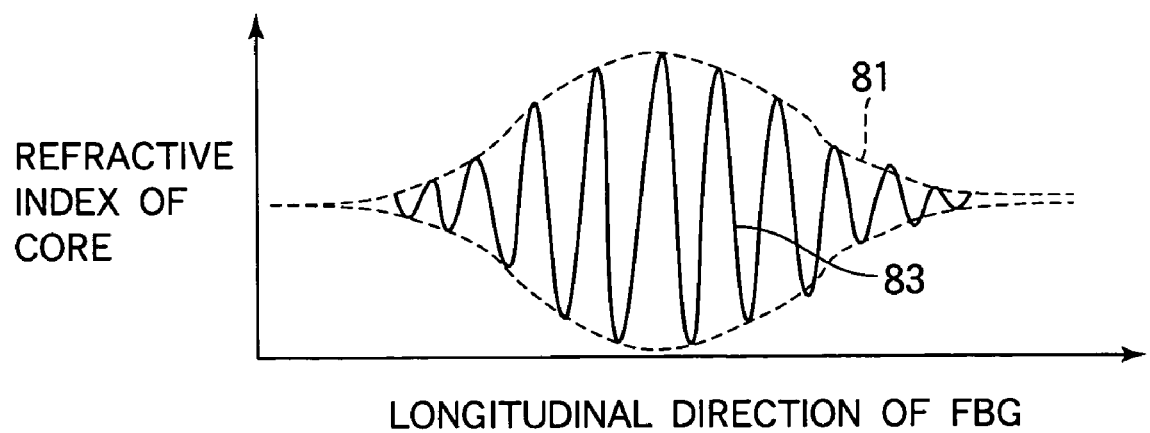

FIGS. 8A and 8B are diagrams illustrating a method for forming apodization by means of the method for fabricating FBGs according to the second embodiment: FIG. 8A shows a waveform of the input voltage of the piezoelectric element of the slight-movement stage, and FIG. 8B shows an amplitude of the refractive index modulation in the core of the optical fiber. Apodization technique is a technique to make the envelope of periodic refractive index modulation of FBGs have a shape as shown in FIG. 8B (bell shape) and to suppress sidelobes caused by Fabry-Perot at each end of the FBGs. The envelope 81 of the periodic refractive index modulation 83 of FBGs is shaped as shown in FIG. 8B if Bragg diffraction gratings are formed with the input amplitude voltage controlled to form a sine wave (or cosine wave) with reference to the longitudinal position of the FBGs, as shown in FIG. 8A. A voltage amplitude required to provide the envelope 81 can be obtained from the relationship between the normalized amplitude of refractive index modulation of diffraction gratings in the core of the optical fiber and the input amplitude voltage of the sine wave shown in FIG. 7. Therefore, apodization can be implemented in the Bragg diffraction gratings in the core of the optical fiber by controlling the input voltage of the piezoelectric element.

Figure 9:
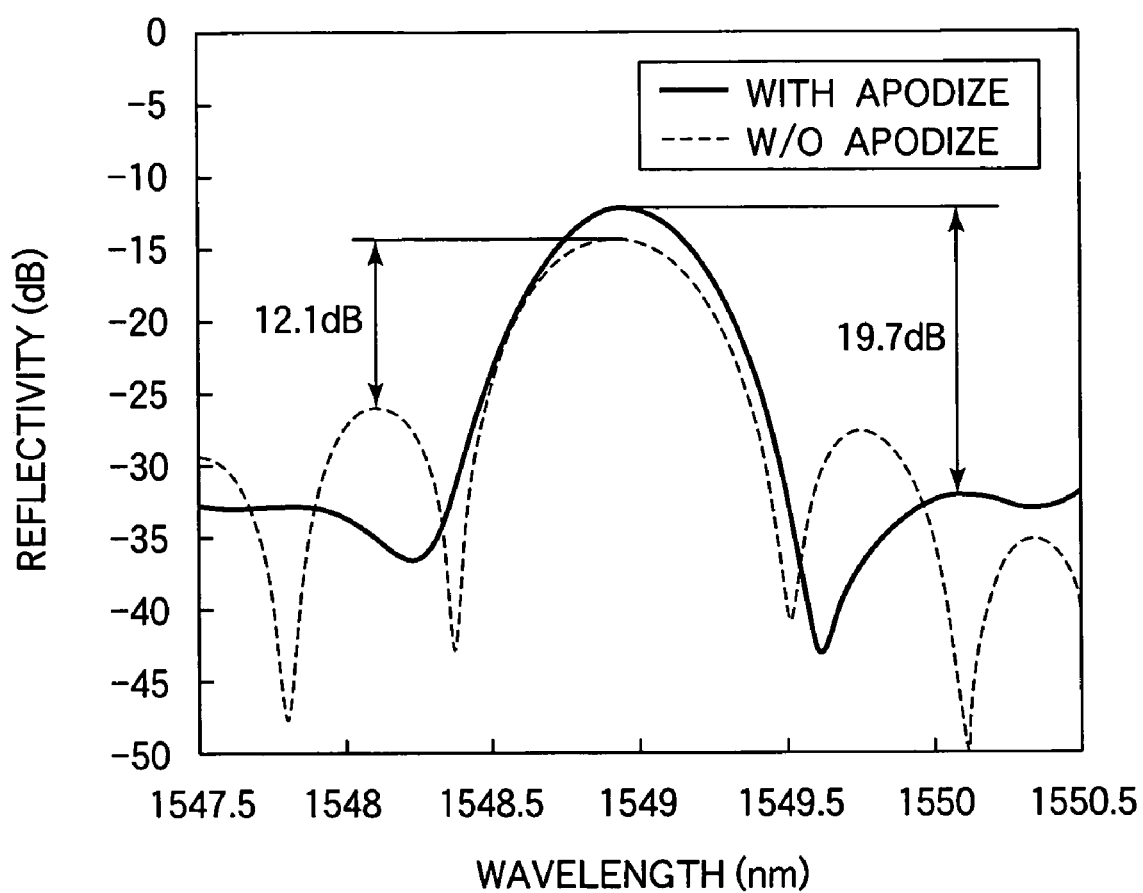
FIG. 9 is a diagram showing a reflection spectrum of FBGs with apodization (the second embodiment) and a reflection spectrum of FBGs without apodization (an example for comparison)

FIG. 9 is a diagram showing a reflection spectrum of FBGs with apodization (the second embodiment) and a reflection spectrum of FBGs without apodization (an example for comparison). These FBGs are 4.8 mm long. The envelope of the apodized refractive index modulation according to the second embodiment is expressed by a raised cosine function given below:

$$f(X)=1+\cos(2\pi X/L) \quad (1)$$

where L is a length of the FBGs. A comparison between the reflection spectrum of apodized FBGs represented by a solid line (denoted as "With apodize") and the reflection spectrum of FBGs without apodization represented by a broken line (denoted as "W/O apodize") in FIG. 9 tells that sidelobes are suppressed in the apodized FBGs. A raised cosine function is used for apodization in the second embodiment, but another function can be used.

The method for fabricating FBGs or fabrication apparatus according to the second embodiment makes it possible to change the refractive index modulation amplitude (implement apodization, for instance) in a desired position of the core 10a of the optical fiber.

Unlike the conventional technique, which vibrates the optical fiber 10, the method and apparatus for fabricating FBGs according to the second embodiment vibrates the phase mask 16 in the longitudinal direction in order to change the amplitude of the refractive index modulation, so that the positional relationship between the ultraviolet laser light 20 and the core 10a of the optical fiber will not change in the Y-axis direction. The width of the phase mask 16 in the Y-axis direction is as large as about 5 mm to 10 mm, so that a displacement of the phase mask 16 in the Y-axis direction will not cause the amount of ultraviolet laser light exposed to the core 10a of the optical fiber to change. Therefore, if Bragg diffraction gratings are formed in the core 10a of the optical fiber by means of the method and apparatus for fabricating FBGs according to the second embodiment, variations in refractive index modulation amplitude resulting from a transverse displacement of the optical fiber can be reduced.

In the second embodiment, if the function voltage generator applies a voltage to the piezoelectric element of the slight-movement stage 14, and if the slight movement stage is vibrated in accordance with a sine function (or cosine function), where the amplitude smoothly varies, the amplitude of refractive index modulation of simulated FBGs and the amplitude of refractive index modulation of actually fabricated FBGs almost agree with each other. Therefore, the amplitude of the refractive index modulation of actually fabricated FBGs can be converted to the input voltage of the piezoelectric element of the slight-movement stage 14, so that the process for providing desired refractive index modulation of FBGs can be designed with ease.

Third Embodiment

A method for fabricating FBGs according to the third embodiment is provided to fabricate FBGs having both a phase shift portion and a change in the amplitude of refractive index modulation; In the method for fabricating FBGs according to the third embodiment, a signal formed by synthesizing the output of a DC voltage generator in the first embodiment and the output of a function voltage generator in the second embodiment is supplied to a piezoelectric element of a slight-movement stage, in order to vibrate or slightly move a phase mask 16.

The method for fabricating FBGs according to the third embodiment (operation of the apparatus for fabricating FBGs according to the second embodiment) includes a step of forming periodic refractive index modulation structure in the core 10a of the optical fiber, in the longitudinal direction of the optical fiber 10, by scanning the optical fiber 10 with the ultraviolet laser light 20 in the longitudinal direction (X-axis direction) in accordance with the phase mask method. The method for fabricating FBGs according to the third embodiment also includes a step of forming a phase shift portion 33 in periodic refractive index modulation structure provided in the core 10a of the optical fiber by instantaneously moving (slight-movement) the phase mask 16 used in the phase mask method by a predetermined distance in the longitudinal direction of the optical fiber 10 when the radiation position of the ultraviolet laser light 20 reaches a predetermined position. This step is concurrently performed with the step of scanning with the ultraviolet laser light 20. The method for fabricating FBGs according to the third embodiment further includes a step of changing an amplitude of the refractive index modulation provided in the core 10a of the optical fiber by vibrating the phase mask 16 used in the phase mask method in the longitudinal direction of the optical fiber 10 and by continuously increasing or decreasing the amplitude of vibration in accordance with the radiation position of the ultraviolet laser light 10.

Figure 10A:
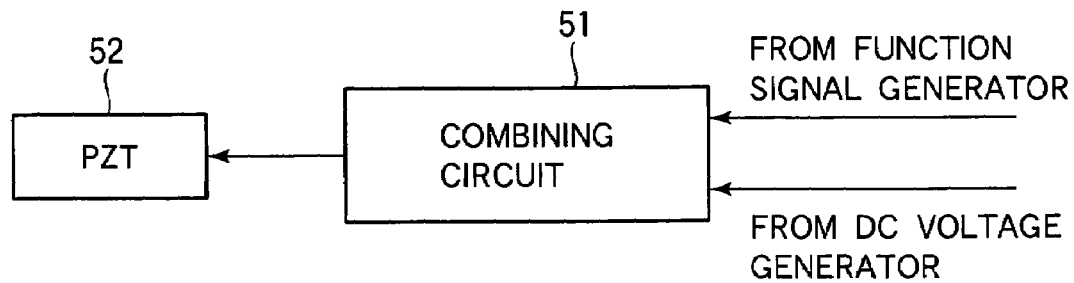
Figure 10B:
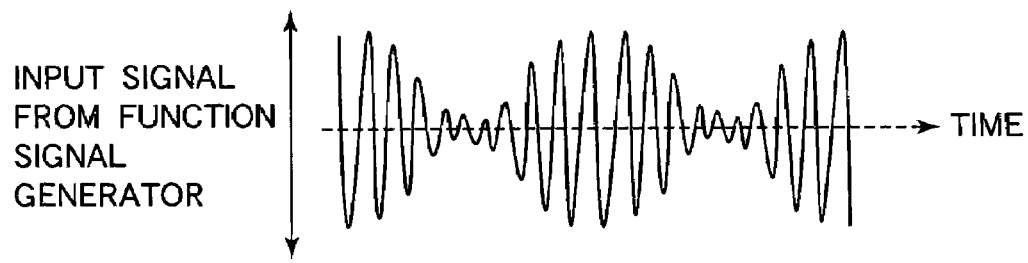
Figure 10C:
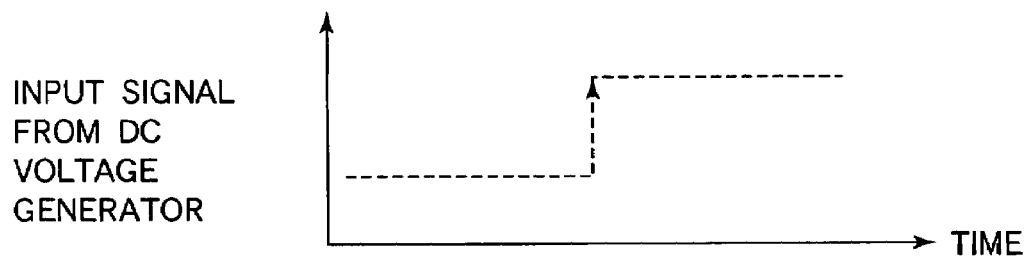
Figure 10D:
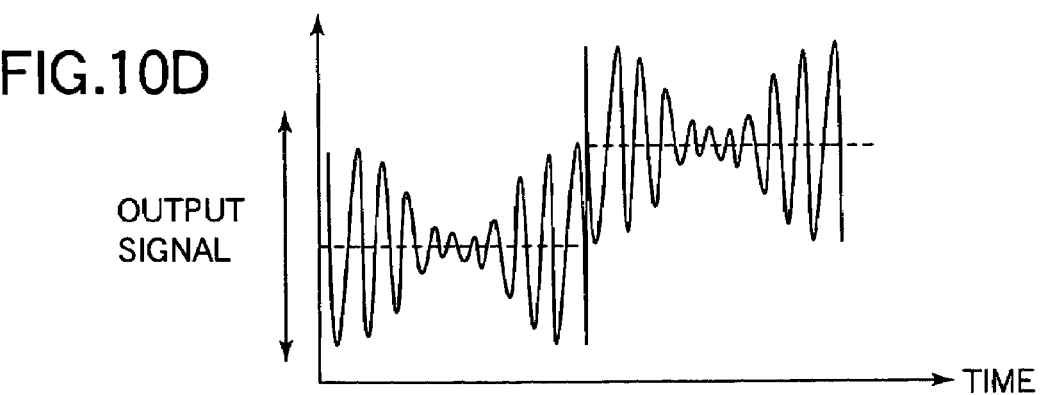

FIGS. 10A to 10D are diagrams illustrating the method for fabricating FBGs according to the third embodiment: FIG. 10A illustrate operation of a drive circuit (a combining circuit) 51 of the piezoelectric element of the slight-movement stage; FIG. 10B shows a sample waveform of the signal input from a function signal generator; FIG. 10C shows a sample waveform of the input voltage from a DC voltage generator; and FIG. 10D shows a waveform of the output from a the combining circuit 51. As shown in FIG. 10A, the combining circuit receives a voltage from the function signal generator and a DC voltage from the DC voltage generator, and outputs a synthesized voltage.

Described as the third embodiment is a method for fabricating FBGs for both forming a single phase shift portion and forming apodization in FBGs. In an example for the description, the FBGs are 2.4 mm long and have one phase shift portion, the length of which is a half the period of Bragg diffraction gratings, in the middle of the length of the FBGs, and apodization of a raised cosine function is formed at intervals of 1.2 mm from an end of the FBGs.

The method for fabricating FBGs according to the third embodiment will next be described. In the fabrication apparatus as shown in FIGS. 1A and 1B, as the X-axis translation stage 12c moves, the core 10a of the optical fiber is scanned with the ultraviolet laser light 20 coming through the phase mask 16. As shown in FIG. 10D, at the beginning of scanning, an amplitude voltage as large as about 268 mV is input to the piezoelectric element, in order to bring the refractive index modulation amplitude to around zero. When Bragg diffraction gratings of 1.2 mm long are formed before a phase shift is formed, a raised cosine function of normalized refractive index modulation amplitude of diffraction gratings in the core of the optical fiber with respect to the input amplitude voltage represented by a sine waveform, as show in Forming, for FBGs having a length of 1.2 mm is used to vary the input voltage amplitude from about 0 mV to 268 mV, as shown in FIG. 10D. To form a phase shift portion the length of which is a half the period of Bragg diffraction gratings (268 μm) in a position where the scanning distance reaches 1.2 mm, a DC voltage of about 180 mV is supplied, as shown in FIG. 10D. After the scanning distance reaches 1.2 mm, the voltage amplitude input to form the remaining part of Bragg diffraction gratings of 1.2 mm long is changed in the same manner as in the scanning of 1.2 mm long prior to the phase shift, as shown in FIG. 10D.

Figure 11A:
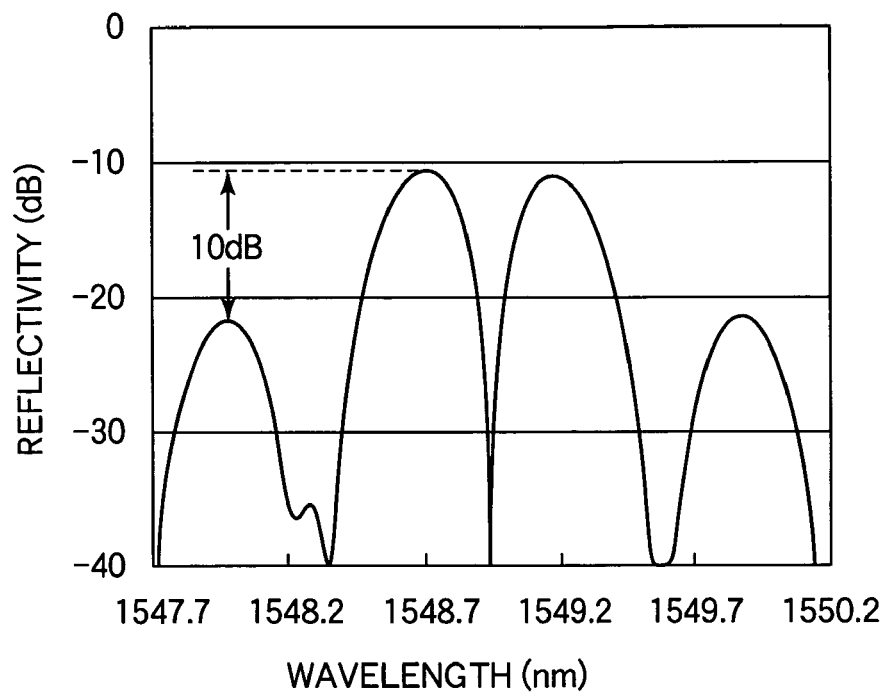
FIG. 11A is a diagram showing a reflection spectrum of FBGs having a phase shift portion without apodization (an example for comparison)
Figure 11B:
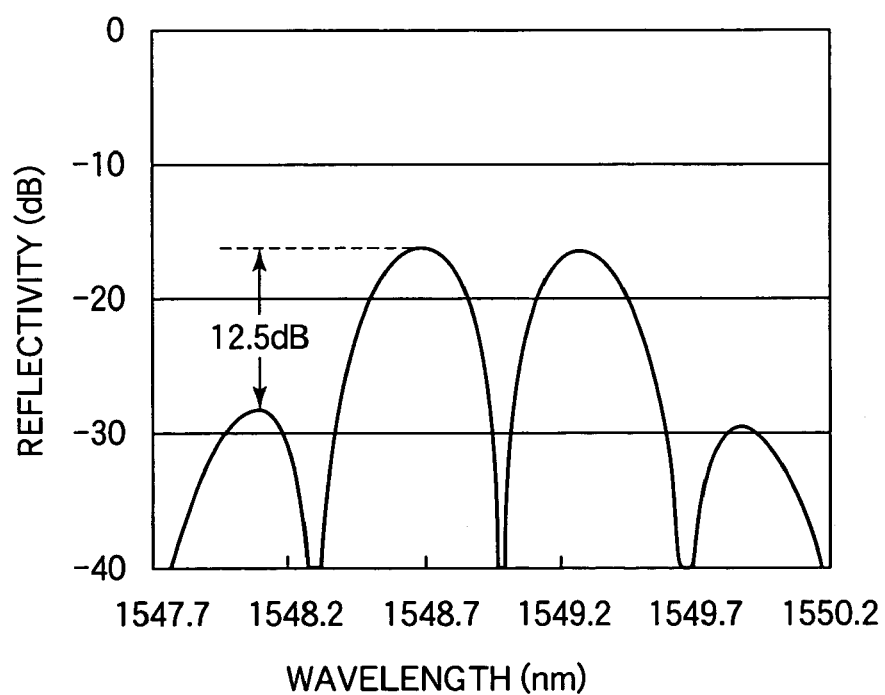
FIG. 11B is a diagram showing a reflection spectrum of FBGs having both a phase shift portion and apodization (the third embodiment)
Figure 12A:
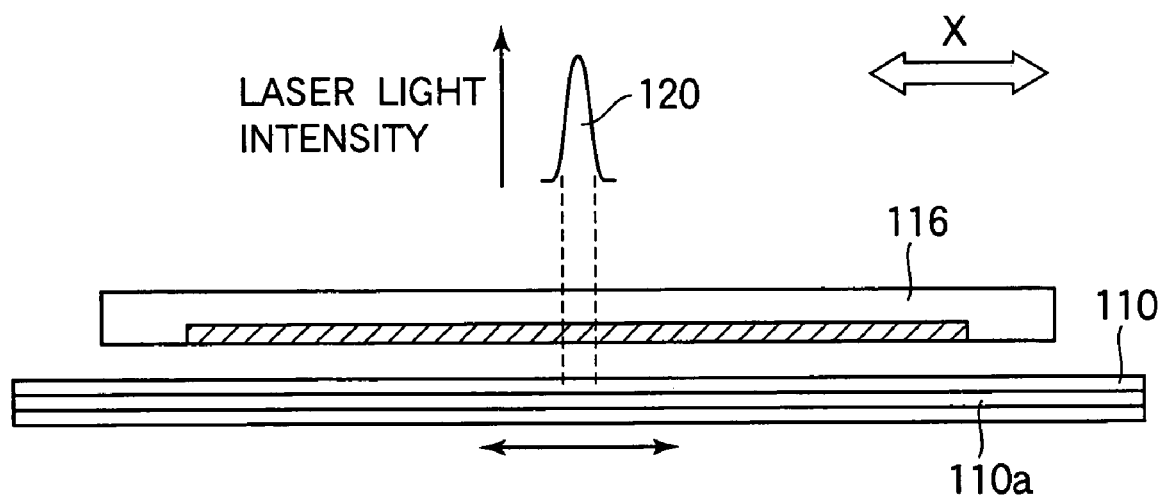
FIGS. 12A and 12B are schematic diagrams showing the positional relationship among laser light, a phase mask, and an optical fiber used in a conventional method for fabricating FBGs, the X-axis direction is shown sideways in FIG. 12A, and the Y-axis direction is shown sideways in FIG. 12B.
Figure 12B:
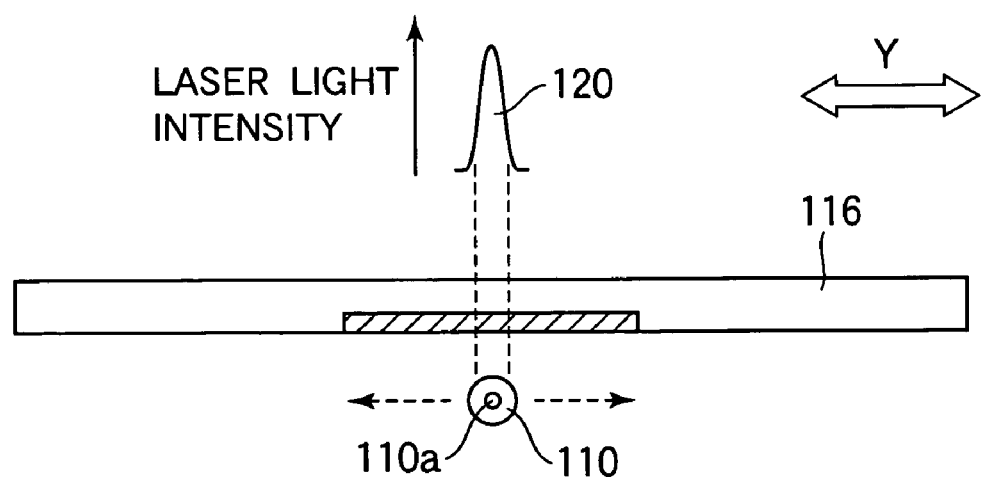

FIG. 11A is a diagram showing a reflection spectrum of FBGs having a phase shift portion and not having apodization (an example for comparison). FIG. 11B is a diagram showing a reflection spectrum of FBGs having both a phase shift portion and apodization (the third embodiment). The reflection spectra of apodized FBGs and non-apodized FBGs shown in FIGS. 11A and 11B pertain to FBGs of 2.4 mm long having a phase shift portion the length of which is a half the period of Bragg diffraction gratings, in the center of the FBGs. The figures show that sidelobes are suppressed in the reflection spectrum of apodized FBGs.

An example for fabricating FBGs having one phase shift portion and using a raised cosine function for apodization has been described above. This method can also be applied to fabricate FBGs having multiple phase shift portions of given phase shift amount and using a given function for apodization. In the method for fabricating FBGs according to the third embodiment, a voltage supplied by the DC voltage generator and a signal supplied by the function voltage generator are combined and applied to the piezoelectric element of the slight-movement stage, in order to vibrate and shift the slight-movement stage, so that FBGs can be fabricated, forming a desired number of phase shifts of a desired amount and forming apodization in accordance with a desired function.

Unlike the conventional technique, in which the optical fiber 10 is moved, the method and apparatus for fabricating FBGs according to the third embodiment slightly moves or vibrates the phase mask 16 in the longitudinal direction, in order to vary the amplitude of the refractive index modulation, so that the positional relationship between the ultraviolet laser light 20 and the core 10a of the optical fiber in the Y-axis direction will not change. The width of the phase mask 16 in the Y-axis direction is as large as 5 mm to 10 mm, so that a displacement of the phase mask 16 in the Y-axis direction will not change the amount of ultraviolet laser light exposed to the core 10a of the optical fiber. Therefore, by forming Bragg diffraction gratings in the core 10a of the optical fiber by means of the method and apparatus for fabricating FBGs according to the third embodiment, variations in refractive index modulation amplitude resulting from a transverse displacement of the optical fiber can be reduced.

Bragg diffraction gratings are formed in the core of an optical fiber in the embodiments described above. The method and apparatus for fabricating FBGs of the present invention, however, can be used to form diffraction gratings in any optical waveguide in which a refractive index varies with ultraviolet laser light.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A method, for fabricating super structure fiber Bragg gratings having multiple phase shift portions formed in positions depending on a code type; the method comprising:
    scanning a photosensitive optical fiber with ultraviolet laser light in a longitudinal direction of the optical fiber by means of a phase mask method, thereby forming a periodic refractive index modulation structure in a core of the optical fiber in the longitudinal direction; and
    instantaneously moving a phase mask used in the phase mask method by a predetermined distance in the longitudinal direction each time a radiation position of the ultraviolet laser light reaches each of predetermined positions in the middle of the scanning step using the ultraviolet laser light, thereby forming the phase shift portions in the periodic refractive index modulation structure formed in the core of the optical fiber,
    wherein the predetermined distance in the instantaneously moving step is smaller than a half a period of diffraction gratings of the phase mask.

2. The method according to claim 1, further comprising:
changing a refractive index modulation amplitude in the refractive index modulation structure in the core of the optical fiber, by vibrating the phase mask in the longitudinal direction of the optical fiber with a vibration amplitude and increasing or decreasing the vibration amplitude continuously in accordance with a radiation position of the ultraviolet laser light, in the middle of the scanning step using the ultraviolet laser light.

3. The method according to claim 2, wherein the vibration amplitude of the phase mask continuously increases or decreases within a range from zero to a half the period of the diffraction gratings of the phase mask.

4. The method according to claim 2, wherein the continuous increase or decrease in the vibration amplitude of the phase mask is any one of a sine function and a cosine function.

5. The method according to claim 2, wherein apodization is formed in the periodic refractive index modulation structure provided in the core of the optical fiber, in the changing step of the periodic refractive index modulation amplitude.

6. A method for fabricating super structure fiber Bragg gratings having multiple phase shift portions formed in positions depending on a code type; the method comprising:
scanning a photosensitive optical fiber with ultraviolet laser light in a longitudinal direction of the optical fiber by means of a phase mask method, thereby forming a periodic refractive index modulation structure in a core of the optical fiber in the longitudinal direction; and
changing a refractive index modulation amplitude in the refractive index modulation structure in the core of the optical fiber, by vibrating the phase mask in the longitudinal direction of the optical fiber with a vibration amplitude and increasing or decreasing the vibration amplitude continuously in accordance with a radiation position of the ultraviolet laser light, in the middle of the scanning step using the ultraviolet laser light;
wherein the vibration amplitude of the phase mask continuously increases or decreases within a range from zero to a half the period of the diffraction gratings of the phase mask.

7. The method according to claim 6, wherein the continuous increase or decrease in the vibration amplitude of the phase mask is any one of a sine function and a cosine function.

8. The method according to claim 6, wherein apodization is formed in the periodic refractive index modulation structure provided in the core of the optical fiber, in the changing step of the periodic refractive index modulation amplitude.

9. An apparatus for fabricating super structure fiber Bragg gratings having multiple phase shift portions formed in positions depending on a code type, which forms a periodic refractive index modulation structure in a core of an optical fiber in a longitudinal direction of the optical fiber, the apparatus comprising:
a fiber holder for holding a photosensitive optical fiber straight;
a phase mask;
an optical system for exposing ultraviolet laser light through the phase mask to the core of the optical fiber held by the fiber holder;
a stage system for moving a radiation position of the ultraviolet laser light in the longitudinal direction of the optical fiber;
a slight-movement stage for instantaneously moving the phase mask in the longitudinal direction of the optical fiber; and
a controller for causing the slight-movement stage to instantaneously move the phase mask by a predetermined distance in the longitudinal direction of the optical fiber each time the radiation position of the ultraviolet laser light reaches each of predetermined positions while the stage system moves the radiation position of the ultraviolet laser light,
wherein the predetermined distance of the instantaneous movement of the phase mask in the longitudinal direction of the optical fiber by the slight-movement stage is smaller than a half the period of the diffraction gratings of the phase mask.

10. The apparatus according to claim 9, wherein the controller controls the slight-movement stage so as to change the periodic refractive index modulation amplitude in the refractive index modulation structure in the core of the optical fiber, by vibrating the phase mask in the longitudinal direction of the optical fiber with a vibration amplitude and continuously increasing or decreasing the vibration amplitude in accordance with a radiation position of the ultraviolet laser light, in the middle of the scanning step using the ultraviolet laser light.

11. The apparatus according to claim 9, wherein
the slight-movement stage includes a piezoelectric element and a drive circuit which applies a drive voltage to the piezoelectric element, and
the controller controls a drive voltage applied to the piezoelectric element by the drive circuit.

12. The apparatus according to claim 9, wherein
the stage system is a mechanism for moving at least any one of the fiber holder and the optical system in the longitudinal direction of the optical fiber.

13. An apparatus for fabricating fiber Bragg gratings, which forms periodic refractive index modulation structure in a core of an optical fiber in a longitudinal direction of the optical fiber, comprising:
a fiber holder for holding a photosensitive optical fiber straight;
a phase mask;
an optical system for applying ultraviolet laser light through the phase mask to the core of the optical fiber held by the fiber holder;
a stage system for moving a radiation position of the ultraviolet laser light in the longitudinal direction of the optical fiber;
a slight-movement stage for instantaneously moving the phase mask in the longitudinal direction of the optical fiber; and
a controller for controlling the slight-movement stage so as to change the periodic refractive index modulation amplitude in the refractive index modulation structure in the core of the optical fiber, by vibrating the phase mask in the longitudinal direction of the optical fiber with a vibration amplitude and continuously increasing or decreasing the vibration amplitude in accordance with a radiation position of the ultraviolet laser light, in the middle of the scanning step using the ultraviolet laser light;
wherein the controller controls the slight-movement stage so that a vibration amplitude of the phase mask continuously increases or decreases within the range from zero to a half a period of the diffraction gratings of the phase mask.

14. The apparatus according to claim 13, wherein the controller controls the slight-movement stage so that the continuous increase or decrease in a vibration amplitude of the phase mask becomes any one of a sine function and a cosine function.

15. The apparatus according to claim 13, wherein the controller controls the slight-movement stage in such a manner that apodization is formed in the periodic refractive index modulation structure in the core of the optical fiber, by varying the periodic refractive index modulation amplitude in the periodic refractive index modulation structure of the core of the optical fiber.

16. The apparatus according to claim 13, wherein
the slight-movement stage includes a piezoelectric element and a drive circuit which applies a drive voltage to the piezoelectric element, and
the controller controls a drive voltage applied to the piezoelectric element by the drive circuit.

17. The apparatus according to claim 13, wherein
the stage system is a mechanism for moving at least any one of the fiber holder and the optical system in the longitudinal direction of the optical fiber.

* * * * *